United States Patent [19]

Willoughby

[11] Patent Number: 4,518,652
[45] Date of Patent: May 21, 1985

[54] METHOD FOR FORMING A LIGHTWEIGHT CEMENTITIOUS STRUCTURAL PRODUCT AND PRODUCT FORMED THEREBY

[75] Inventor: Michael D. Willoughby, Palatine, Ill.

[73] Assignee: United States Gypsum Company, Chicago, Ill.

[21] Appl. No.: 514,349

[22] Filed: Jul. 15, 1983

[51] Int. Cl.³ .................................................. B32B 5/18
[52] U.S. Cl. .................................... 428/312.4; 106/88; 106/111; 156/43; 156/41; 428/703
[58] Field of Search ................. 106/88, 111, 122, 314; 156/39, 41, 43; 428/312.4, 703

[56] References Cited

U.S. PATENT DOCUMENTS

| | | | |
|---|---|---|---|
| 2,862,829 | 12/1958 | Dixon et al. | 106/88 |
| 3,963,507 | 6/1976 | Kuramoto et al. | 106/88 X |
| 4,094,694 | 6/1978 | Long | 106/111 |

Primary Examiner—Robert A. Dawson
Attorney, Agent, or Firm—Samuel Kurlandsky; Robert M. Didrick; Robert H. Robinson

[57] ABSTRACT

A method for producing a lightweight set cementitious product, and more specifically, gypsum wallboard, having excellent strength and paper-to-core bond, which method comprises producing a foam comprising polyvinyl alcohol and water, introducing the foam thus formed into an aqueous cementitious slurry, depositing the slurry between paper cover sheets, and permitting the cementitious slurry to set. In a further embodiment an emulsion formed of asphalt and wax is added to the cementitious slurry to impart water resistance, the polyvinyl alcohol of the foaming agent cooperating with the asphalt and wax emulsion to improve the water resistant properties of the set gypsum wallboard.

16 Claims, No Drawings

METHOD FOR FORMING A LIGHTWEIGHT CEMENTITIOUS STRUCTURAL PRODUCT AND PRODUCT FORMED THEREBY

BACKGROUND OF THE INVENTION

1. Field of the Invention

The present invention relates to the production of cementitious structural materials, and is more particularly concerned with the production of lightweight gypsum wallboard.

2. Description of the Prior Art

Gypsum wallboard is manufactured commercially by processes which are capable of operation under continuous high speed conditions. In carrying out these processes, an aqueous slurry of calcined gypsum is continuously deposited on a moving sheet of paper which constitutes one cover sheet for the final product. The slurry so deposited is leveled and a second cover sheet simultaneously applied, one of the cover sheets being folded over the edges of the unset slurry. The gypsum forming the core between the opposed sheets is then allowed to set, and the resulting board is cut into panels of the desired length and passed through a drying kiln in which the excess water is removed and the gypsum brought to a final set. In the operation of high speed gypsum wallboard machines of the type described it is important that quick setting gypsum slurries are employed in order that production may be maintained at a suitable rate. Thus, as is well known, the calcined gypsum employed usually includes set accelerators so that the core of the board will be essentially completely set within a few minutes after the slurry has been formed.

In the commercial manufacture of gypsum wallboard it is generally desired that the product be light in weight, and this result has been accomplished by incorporating a pre-generated tenacious foam directly into the gypsum and water slurry at the time that it is initially mixed. This procedure is well known in the art and is disclosed in Roos U.S. Pat. No. 2,017,022, issued Oct. 8, 1935, and in Roos U.S. Pat. No. 2,080,009, issued May 11, 1937. In accordance with the disclosures in these patents, a pre-generated tenacious foam is admixed with the calcined gypsum and water under conditions to form a foamed slurry, and this slurry is then used for the manufacture of gypsum wallboard to produce a product having a lightweight cellular core.

In the manufacture of lightweight gypsum wallboard of the type described, the finished product is subjected to a drying operation in a kiln in order to remove any residual free water that may be left in the board. This kiln drying sometimes results in a weakening of the board, particularly at its edges, due to the fact that some dehydration of the gypsum dihydrate may occur adjacent to the edges of the board, as a result of the surface area exposed to the drying operation adjacent the edges. This phenomenon occurs even though the raw edges of the core are covered by fold-over portions of the cover sheets.

Many attempts have been made to strengthen the edges of wallboard which has been foamed to make it lightweight. In U.S. Pat. No. 2,985,219, dated May 23, 1961, a process and apparatus are disclosed for strengthening the edges of the wallboard produced by utilizing foaming. In carrying out this process, a foamed gypsum slurry is prepared by conventional techniques under relatively mild conditions of blending or mixing such that the foam is not broken to any substantial degree during the operation. Thereafter, at least a portion of the resulting slurry is intensely or violently mixed under conditions such that a substantial portion of the foam in the slurry is broken. During this supplemental mixing, additional foam is added to the mixer to replace at least a portion of the foam broken in the supplemental mixing operation. The foamed slurry discharged from the supplemental mixture is deposited on a moving support of a conventional plasterboard machine, whereafter it is formed by a roller and passed through conventional settings, cutting and drying zones. This results in a product which is lightweight, but yet has strengthened edges.

SUMMARY OF THE INVENTION

It is an object of the invention to provide lightweight cementitious construction products.

It is a further object to provide lightweight gypsum wallboard which has good strength properties.

It is still another object to provide a foaming agent for the production of lightweight gypsum wallboard, which foaming agent does not impair the strength properties of the wallboard as does conventional foaming agents.

It is still another object to provide a foaming agent for the production of lightweight gypsum wallboard which, when used with a formulation comprising a conventional asphalt-wax emulsion, enhances the ability of the emulsion to render the finished wallboard water-resistant.

It is still an additional object to provide a foaming agent for the production of lightweight gypsum wallboard which improves the paper-to-gypsum bond.

These and other objects, advantages and functions of the invention will be apparent on reference to the specification and appended claims.

According to the invention, a conventional calcined gypsum slurry for the production of gypsum wallboard is prepared. A foaming agent is prepared comprising an aqueous solution of polyvinyl alcohol which is beaten to form a foam. The foam is introduced into and mixed with the gypsum slurry and the slurry deposited on a conveyor between paper cover sheets, permitted to set and dry, and then cut into panels. The resulting gypsum wallboard is light in weight, has improved strength properties and exhibits improved paper-to-gypsum bond.

DESCRIPTION OF THE PREFERRED EMBODIMENTS

The foaming agent of the present invention may be prepared by any one of several different methods. In one method dry powdered polyvinyl alcohol is dissolved in a tank of water maintained at a temperature of about 100° F. and mixed to a concentration of about 10%. The foaming agent is then passed into a conventional foaming apparatus where it is foamed to the desired consistency. A 10% polyvinyl alcohol solution, premixed, is also available in that form from several suppliers. The solution as purchased may be then directly introduced into the foaming apparatus.

In an alternative method dry powdered polyvinyl alcohol is mixed with water at ambient temperature. The mixture is first subjected to slight agitation by such means as a Lightnin Mixer. This suspends the polyvinyl alcohol into the water and begins the process of dissolution. The suspension is then passed through various apparatus such as meters and pumps, and then into a high shear foaming apparatus. Here the polyvinyl alcohol becomes completely dissolved in the water, foamed to the desired consistency and introduced into an aqueous calcined gypsum slurry.

The aqueous polyvinyl alcohol foaming agent of the present invention may be used to form several different types of gypsum wallboard. First, the foaming agent may be used to form conventional gypsum board, and advantages are realized in that avoiding the use of conventional detergent or soap type foaming agents avoids the weakening of physical properties generally accompanied by use of these conventional agents. Additionally, the fact that polyvinyl alcohol also acts as a binder results in gypsum wallboard having improved paper-to-gypsum adhesion.

The present foaming agent is also useful in the production of so-called "water-resistant" gypsum wallboard. In the production of water-resistant wallboard, as disclosed in U.S. Pat. No. 4,094,694, the contents of which are hereby incorporated by reference, an emulsion of asphalt and wax used with a polyvinyl alcohol additive is utilized to render the wallboard water-resistant. In this usage the polyvinyl alcohol serves to enhance the water-resistant properties provided by the asphalt-wax emulsion. It has been found that when the present foaming agent containing polyvinyl alcohol is utilized to foam the gypsum slurry to make the resulting wallboard light in weight, additional polyvinyl alcohol need not be added to the asphalt-wax emulsion. The presence of the polyvinyl alcohol foaming agent serves a double purpose. First it provides foam for the gypsum, and second, it enhances the action of the asphalt-wax emulsion. In fact, it has been found that when the present foaming agent is used, less asphalt-wax emulsion may be utilized while still attaining the same high degree of water resistance in the resulting wallboard. In addition, the enhanced strength of the gypsum wallboard and the improved adhesive properties between the paper cover sheets and the gypsum are achieved.

EXAMPLES #1 and #2

Plant test were conducted on ordinary gypsum wallboard to compare the present method of utilizing polyvinyl alcohol foam to make the gypsum board lightweight compared with conventional methods where the foam is produced from a soap or synthetic type foaming agent. The polyvinyl alcohol foaming agent was a commercial product marketed as a 10% aqueous solution by The H. B. Fuller Co. The solution comprised 10% Vinol 205-S, a polyvinyl alcohol having a degree of hydrolysis of about 87%-91%. The product is produced by hydrolyzing polyvinyl acetate to produce the desired amount of polyvinyl alcohol, the remainder being polyvinyl acetate. In carrying out the experiment utilizing conventional soap type foaming agents, the foaming agent was mixed with the stated amount of mixing water and pumped to a high shear centrifugal pump which completed the foaming process. The gypsum slurry was prepared from the formulation shown below in Table I in conventional manner. The proper amount of foam was then introduced and mixed into the gypsum slurry and the slurry spread on a conveyor between paper cover sheets to form ⅜" board, set, cut into panels, and further dried. The product according to the invention was prepared by turning off the soap foaming agent and introducting the polyvinyl alcohol foaming agent to the centrifugal pump. The polyvinyl alcohol foam was then introduced into the gypsum slurry in similar manner and formed into ⅜" gypsum board. In Example #1, the conventional synthetic foaming agent was MilliFoam, a soap type foaming agent marketed by Onyx Chemical Company.

TABLE I

| FORMULATION | | |
|---|---|---|
| | Control Example #1 | Example #2 |
| Calcium Sulfate Hemihydrite, lbs/MSF | 1585 | 1585 |
| Gauging Water, lbs/MSF | 1150 | 1150 |
| Foam Water, lbs/MSF | 229 | 212 |
| Foam, lbs/MSF | 0.443 | — |
| Foam Weight, lbs/ft$^3$ | 6.2 | 6.4 |
| Starch, lbs/MSF | 11.5 | 11.4 |
| Accelerator, lbs/MSF | 12.4 | 13.5 |
| PVA, lbs (solids)/MSF | — | 2.0 |

As used throughout the specification, MSF means pounds per thousand square feet of dried wallboard, in either one-half inch or ⅜ inch thickness as specified.

The accelerator designated throughout is finely ground calcium sulfate dihydrate mixed together with 5% sugar. The foam with respect to Example #1 is a conventional foaming agent which is a sodium alkyl ether sulfate. The PVA refers to the polyvinyl alcohol foaming agent of the invention and is given in solids designation. The conventional soap type foaming agent is purchased as a liquid having 56% solids.

Tests of the product formed showed that the use of polyvinyl alcohol foam significantly increases the paper-to-core bond and transverse strength.

Transverse strength tests conducted on the samples after conditioning at 110° F.-25%R (relative humidity) showed that the higher temperature produced even more significant increases in the strength of the samples containing the polyvinyl alcohol foam. The tests also showed that a change in conditioning from 75° F. at 50% relative humidity to 110° F. at 25% relative humidity resulted in an average 12% increase in strength for the control samples of Example #1 and an 18% increase in the polyvinyl alcohol foam sample of Example #2.

EXAMPLES 3, 4 and 5

Plant tests were made to compare the conventional process for preparing a soap type foam and introducing it into the gypsum wallboard slurry with the method of the present invention using a polyvinyl alcohol solution as a foaming agent. In Example 3 a conventional soap foaming agent was used. In Examples 4 and 5 a 10% aqueous Vinol 205-S solution prepared by the H. B. Fuller Co. was utilized. The 10% Vinol 205-S solution comprised polyvinyl alcohol hydrolyzed to a degree of about 87-91% and dissolved in water. One-half inch water-resistant gypsum wallboard was produced from a slurry also including an asphalt-wax emulsion to render the wallboard water-resistant. In Examples 4 and 5 the foaming agent was prepared by placing the 10% polyvinyl alcohol solution in a tank and into a blending pump as required. From the blending pump the solution was introduced into a centrifugal high shear pump for forming the foam. The conventional synthetic foaming agent was also mixed with water and introduced into the blending pump and the centrifugal pump. From the centrifugal pump the foam was introduced into the gypsum slurry in the required amount.

The apparatus was first started and began making one-half inch water-resistant wallboard of conventional formulation. After a period of running, the soap pump was turned off and the pump for introducing the aqueous polyvinyl alcohol foaming agent was turned on. At the same time, in order to test the effectiveness of the polyvinyl alcohol foaming agent, the asphalt-wax emulsion usage was reduced by 3.3 gallons, from 20.5 to 17.2 gallons/MSF. This formulation was then run for approximately 30 minutes.

In further tests it was shown that the belt speed of the gypsum board fabricating apparatus could be increased by ten feet per minute since a lower asphalt-wax emulsion usage was possible, since this required less heat in the kiln to dry the board.

Table II below shows the formulation utilized in Examples 3–5.

TABLE II

| FORMULATION | | | |
|---|---|---|---|
| | Control Example #3 | Example #4 | Example #5 |
| Calcium Sulfate Hemihydrate lbs/MSF | 1428 | 1428 | 1428 |
| Gauging Water, lbs/MSF | 867 | 867 | 921 |
| Pulp Water, lbs/MSF | 247 | 247 | 240 |
| Foam Water, lbs/MSF | 151 | 151 | 149 |
| Asphalt-wax Emulsion, Gal/MSF | 20.5 | 17.0 | 16.8 |
| Starch, lbs/MSF | 10.1 | 10.1 | 9.0 |
| Accelerator, lbs/MSF | 3.3 | 3.3 | 4.5 |
| $K_2SO_4$, lbs/MSF | 5.9 | 5.9 | 4.9 |
| PVA Solution, lbs/MSF | — | 20.0 | 20.3 |
| Soap Foaming Agent, lbs/MSF | 0.23 | — | — |

Foam density was in a range of 10 to 12 lb/ft$^3$ on all samples.

Table III below shows the results of conventional water absoption tests carried out on samples of the finished wallboard.

TABLE III

| WATER ABSORPTION TEST RESULTS | | | |
|---|---|---|---|
| | Example #3 | Example #4 | Example #5 |
| 1 Hour Absorption, % | 3.8 | 3.3 | 3.0 |
| 2 Hour Absorption, % | 4.8 | 4.1 | 3.9 |

The asphalt-wax emulsion utilized in the examples throughout comprises 2259 lbs of asphalt, 454 lbs of paraffin wax, 9.25 lbs petronate, an emulsifier, and 246 gallons of water. The use of the asphalt-wax emulsion is disclosed in U.S. Pat. No. 4,094,694, the contents of which are incorporated herein by reference.

Further tests were carried out in which the foaming agent was prepared in-plant by dissolving the polyvinyl alcohol such as Vinol 205-S in water maintained at least 100° F., and stirring the water until solution was complete. Tests carried out with the in-plant prepared foaming agent resulted in lightweight gypsum wallboard of excellent properties equal to those prepared with the 10% proprietary solution purchased from the H. B. Fuller Co.

In the previous examples where a polyvinyl alcohol foaming agent was utilized, the material used was a proprietary 10% solution of Vinol 205-S dissolved in water. Because the transportation of water is relatively expensive, a similar solution may be prepared in-plant, as described above, by heating water to a temperature of about 100° F. or higher and introducing therein dry powdered Vinol 205-S. However, even here the expense of heating the water is substantial. To overcome this expense the following method was developed for incorporating dry powdered polyvinyl alcohol into water and to produce a foam.

EXAMPLE 6

A suspension of dry powdered polyvinyl alcohol and water was prepared with mixing water and fed to the conventional centrifugal pump foam generator. In preparing the material of Example 6 Vinol 205-S in dry solid form was fed to a drum by an Acrison Feeder, variable drive. Usage rate was approximately 1.8 lbs/MSF dry solids. The water source was secured from the gauging water system prior to metering, and fed to the drum without heating the water. A one-half hp. Lightnin Mixer was installed in the drum and controlled by a Varidyne solid state controller. The R.P.M. was kept at a low rate to maintain the suspension but to avoid foaming in the drum. The drum material was piped directly to the suction side of a foam water pump for metering, and introduced into the foam generator. The foam generator completed the solution of the polyvinyl alcohol in the water and at the same time produced a foam. The foam was used in conventional manner to produce ½" gypsum wallboard of excellent properties. The formulation is shown below in Table IV.

TABLE IV

| FORMULATION | |
|---|---|
| | Example #6 |
| Calcium Sulfate Hemihydrate, lbs/MSF | 1405.8 |
| Gauging Water, lbs/MSF | 1023.2 |
| Foam Water, lbs/MSF | 170.1 |
| Starch, lbs/MSF | 12.2 |
| Accelerator, lbs/MSF | 8.0 |
| $K_2SO_4$, lbs/MSF | 3.8 |
| Asphalt wax Emulsion, Gal/MSF | 17.7 |
| Vinol 205-S, lbs/MSF (1.75 lbs Solids, 10% Solution) | 17.5 |

The use of the method of Example 6, whereby dry powdered polyvinyl alcohol is introduced into ambient temperature water from a tap without further heating and dissolved when passed through the foaming apparatus, provides a savings in cost over the use of prepared 10% polyvinyl solution purchased from suppliers and shipped at at substantial freight costs. The method also provides savings over the in-plant dissolution of polyvinyl alcohol in warm water since the energy needed to bring the water to the proper temperature is obviated.

It has been found that polyvinyl alcohols which are from about 87% to 91% hydrolyzed (9% to 13% residual polyvinyl acetate) and have a molecular weight in the range of from about 22,000 to about 110,000 are the most effective for use as foaming agents in the production of gypsum wallboard. Polyvinyl alcohols which are hydrolyzed up to 95% may be utilized, but their effectiveness is much reduced. Further, polyvinyl alcohols which are hydrolyzed from 75% to 87% may be used, but are not as effective as those within the preferred range.

The use of a polyvinyl alcohol foaming agent in the production of water-resistant gypsum wallboard has the following advantages:

1. A polyvinyl alcohol can be used which has a lower percent of hydrolysis than that which must be used to activate the asphalt-wax emulsion of the conventional method as disclosed in U.S. Pat. No. 4,094,694, noted above. In the process described therein the solution must be warmed to dissolve the polyvinyl alcohol. In the present system the polyvinyl alcohol can still be dissolved when being passed through the foaming equipment. This provides a considerable reduction in the fuel energy needed to dissolve the material.

2. The use of polyvinyl alcohol as a foaming agent provides improved water resistance, thereby permitting a reduction in the asphalt-wax emulsion usage.

3. The use of a polyvinyl alcohol foaming agent permits the elimination of the use of a conventional synthetic foaming agent which has an adverse effect on the strength of the finished gypsum wallboard.

4. The use of a polyvinyl alcohol as a foaming agent also provides improved paper-to-core bonding.

5. Reduction in water demand to produce the required consistency, thereby permitting a reduction in energy required for drying.

The polyvinyl alcohol suitable for use in the present invetion should have a degree of hydrolysis of from about 75%-95%. A preferred material has a degree of hydrolysis of about 87%-91%.

The foam prepared from the polyvinyl alcohol solution should have a density of from about 2 lbs to about 20 lbs/cubic foot, with a preferred density of from about 5 lbs to about 10 lbs/cubic foot.

Foam usage in the range of from about 1 lb to about 5 lbs polyvinyl alcohol (solid contents)/MSF is preferred for making good gypsum wallboard.

Although the present invention has been described primarily in regards to its use in making gypsum wallboard, it may also be used to form other cementitious compositions such as those which are used to form cement board and related products.

It is to be understood that the invention is not to be limited to the exact details of operation or materials described, as obvious modifications and equivalents will be apparent to those skilled in the art.

Invention is claimed as follows:

1. A method for the production of a lightweight structural member, which comprises preparing a settable aqueous slurry of a cementitious material, mixing an aqueous foam into said slurry, forming said slurry into the proper shape for said structural member, and setting and drying said cementitious material, said foam being prepared by passing water and a foaming agent consisting essentially of polyvinyl alcohol through a foaming apparatus.

2. A method according to claim 1, wherein said cementitious material is calcium sulfate hemihydrate and said structural member is gypsum wallboard.

3. A method according to claim 2, wherein said polyvinyl alcohol is dissolved in said aqueous foaming agent.

4. A method according to claim 2, wherein said polyvinyl alcohol has a degree of hydrolysis of from 75%-95%.

5. A method according to claim 2, wherein said polyvinyl alcohol has a degree of hydrolysis of 87%-91%.

6. A method according to claim 2, wherein said foam has a density of from about 2 lbs to about 20 lbs per cubic foot.

7. A method according to claim 2, wherein an asphalt-wax emulsion is added to said aqueous slurry to render said gypsum board water-resistant.

8. A method according to claim 2, wherein said foam is formed by adding dry powdered polyvinyl alcohol to said water at ambient temperature, and passing the mixture through a foaming apparatus, whereby said polyvinyl alcohol becomes dissolved in said water and a foam is formed.

9. A lightweight structural member produced by preparing a settable aqueous slurry of a cementitious material, mixing an aqueous foam into said slurry, forming said slurry into the proper shape for said structural member, and setting and drying said cementitious material, said foam being prepared from water and a foaming agent consisting essentially of polyvinyl alcohol.

10. A structural member according to claim 9, wherein said cementitious material is calcium sulfate hemihydrate and said structural member is gypsum wallboard.

11. A structural member according to claim 10, wherein said polyvinyl alcohol is dissolved in said aqueous foaming agent.

12. A structural member according to claim 10, wherein said polyvinyl alcohol has a degree of hydrolysis of from 75%-95%.

13. A structural member according to claim 10, wherein said polyvinyl alcohol has a degree of hydrolysis of 87%-91%.

14. A structural member according to claim 10, wherein said foam has a density of from about 2 lbs to about 20 lbs per cubic foot.

15. A structural member according to claim 10, wherein said slurry includes an asphalt-wax emulsion to render said gypsum board water-resistant.

16. A structural member according to claim 10, wherein said foam is formed by adding dry powdered polyvinyl alcohol to said water at ambient temperature to form a foaming mixture, and passing the mixture through a foaming apparatus, whereby said polyvinyl alcohol becomes dissolved in said water and a foam is formed.

* * * * *